(12) United States Patent
Haltom et al.

(10) Patent No.: US 9,113,031 B2
(45) Date of Patent: Aug. 18, 2015

(54) CALL CONTROL FOR CONFERENCING CALLS

(75) Inventors: Jeffrey A. Haltom, Fishers, IN (US); Jeffrey J. Reger, Peyton, CO (US); Mark Stallcup, Richardson, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1200 days.

(21) Appl. No.: 12/790,245

(22) Filed: May 28, 2010

(65) Prior Publication Data

US 2011/0292163 A1 Dec. 1, 2011

(51) Int. Cl.
*H04N 7/14* (2006.01)
*H04N 7/15* (2006.01)
*H04L 29/06* (2006.01)

(52) U.S. Cl.
CPC .............. *H04N 7/15* (2013.01); *H04L 65/4038* (2013.01)

(58) Field of Classification Search
CPC ....... H04M 3/56; H04M 3/561; H04M 3/567; H04Q 2213/13209; H04L 29/06027; H04N 7/15; H04N 7/152
USPC ......... 348/14.08–14.1, 211.12; 370/260–266; 379/93.21, 158, 202.01, 205.01; 455/416
See application file for complete search history.

(56) References Cited

U.S. PATENT DOCUMENTS

| | | | |
|---|---|---|---|
| 6,917,587 B1 * | 7/2005 | Sarkar et al. | 370/230 |
| 2005/0238156 A1 * | 10/2005 | Turner | 379/202.01 |
| 2008/0181140 A1 * | 7/2008 | Bangor et al. | 370/261 |
| 2011/0135073 A1 * | 6/2011 | Lingafelt et al. | 379/93.02 |
| 2011/0150200 A1 * | 6/2011 | Uhler et al. | 379/202.01 |

\* cited by examiner

*Primary Examiner* — Akelaw Teshale (57) ABSTRACT

A server device may receive information, associated with a request for a conferencing call, from a call manager, which is responsible for establishing and handling conferencing calls. The server device is a different device than the call manager. The server device may further determine to permit the conferencing call based on the received information, and provide an instruction to the call manager to permit the conferencing call in response to determining to permit the conferencing call.

20 Claims, 8 Drawing Sheets

CALL CONTROL FOR CONFERENCING CALLS

BACKGROUND

Call managers typically may be used to facilitate Voice over Internet Protocol (VoIP) calls between end points in an Internet Protocol (IP) network. Such call managers track active network components (e.g., VoIP phones, gateways, bridges, etc.) involved in the VoIP calls between the end points in the IP network. With the advent of video IP phone conferencing, however, existing VoIP call managers may not include adequate functionality for exercising control over calls associated with video conferencing sessions. For example, existing call managers may not include functionality for performing failover determination during the video conferencing call, or for performing call resource availability determination, call resource assignment, or call authorization during set-up of the video conferencing call.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A server, according to example embodiments described herein, may connect to nodes that establish video conferencing calls between end points. The server may provide additional functionality, not provided by the nodes, for exercising control over the video conferencing calls. For example, the server may perform failover determination prior to or during the video conferencing call, call authorization, resource availability determination, call resource assignment, and/or other operations in relation to establishing and/or handling video conferencing calls.

While the foregoing description focuses on video conferencing calls, embodiments described herein are not so limited. For example, it will be appreciated that embodiments described herein are equally applicable to other types of calls, such as audio conferencing calls.

Figure 1:
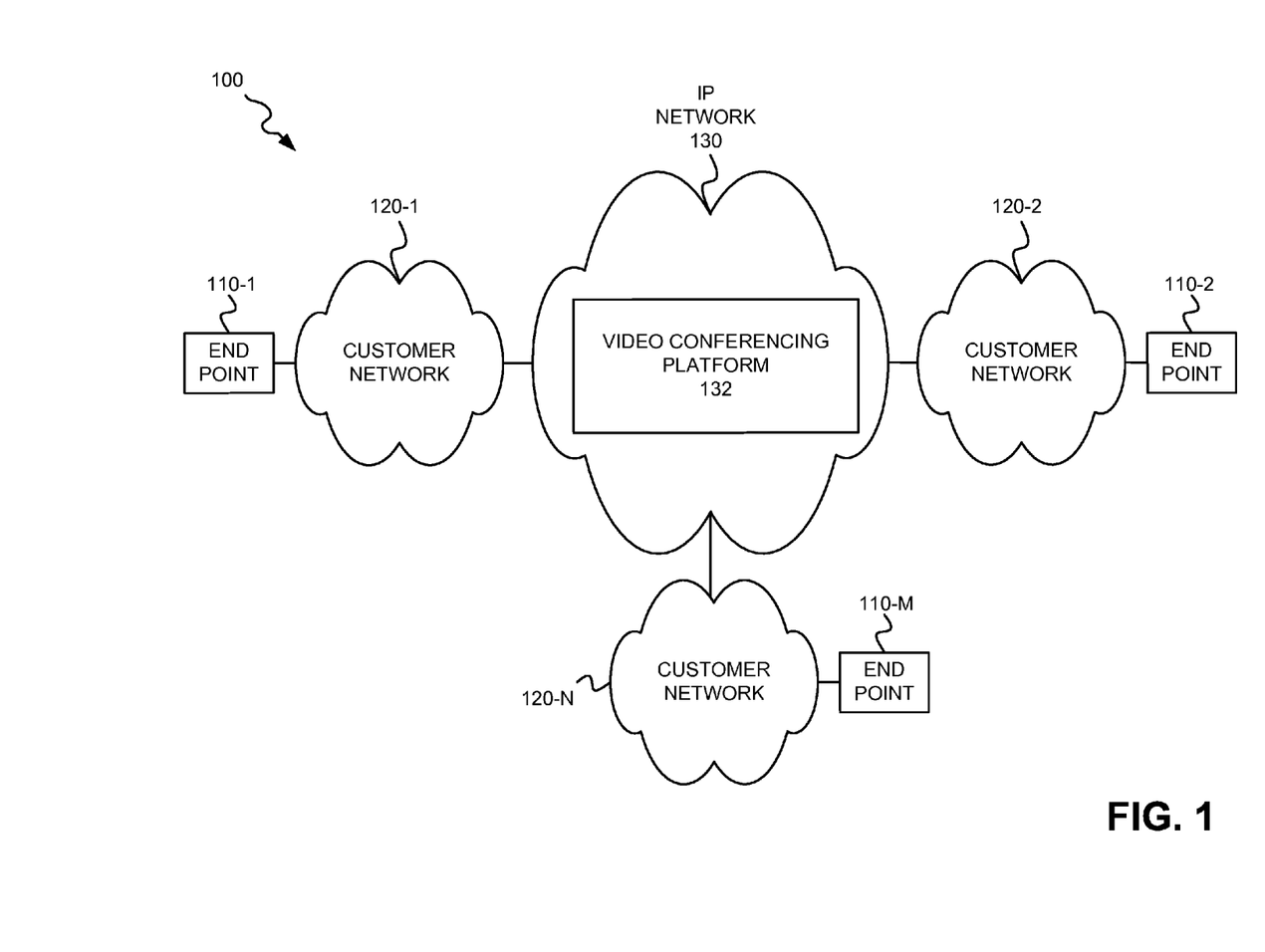
FIG. 1 is a diagram of an example network in which a video conferencing session may be established and conducted between end points according to an example embodiment.

FIG. 1 is a diagram of an example network 100 in which a point-to-point or a point-to-multipoint video conferencing call may be established and conducted between end points according to an example embodiment. Network 100 may include end points 110-1 to 110-M (referred to collectively as "end points 110" and, in some instances, individually as "end point 110"), customer networks 120-1 to 120-N (referred to collectively as "customer network 120" and, in some instances, individually as "customer network 120"), and an IP network 130 that interconnects customer networks 120.

End points 110 may include one or more devices that can capture, transmit, and/or receive video as part of a video conferencing call (or session). End points 110 may include one or more devices that establish and conduct the video conferencing call via IP network 130. For example, end points 110 may include video cameras, video transmission/reception devices (e.g., a computer, a laptop, a mobile device, and/or other types of devices), etc.

Customer networks 120 may include any type of network that may connect to IP network 130 to enable the establishment of video conferencing calls between end points 110. Customer networks 120 may include a local area network (LAN), a wide area network (WAN), and/or another type of network. In one embodiment, customer networks 120 may include enterprise networks.

IP network 130 may include one or more IP networks, such as, for example, a WAN, a metropolitan area network (MAN), the Internet, a wireless satellite network, and/or a wireless public land mobile network (PLMN) that uses IP for packet transmission and forwarding. In one embodiment, IP network 130 may include a private IP network that is operated by a single entity (e.g., operated by a single company or organization). In addition, or alternatively, IP network 130 may include one or more non-IP networks, such as a Public Switched Telephone Network (PSTN). In one embodiment, IP network 130 may implement a Multi-Protocol Label Switching (MPLS) Virtual Private Network (VPN).

As illustrated, IP network 130 may include a video conferencing platform 132. Video conferencing platform 132 may include one or more components that allow video conferencing calls to be established between end points 110. For example, video conferencing platform 132 may configure end points 110 and/or customer networks 120 for a video conferencing call, authenticate the video conferencing call, and allocate the necessary resources for establishing and conducting the video conferencing call through IP network 130. In one embodiment, the video conferencing call may include a high definition video conferencing call.

The number of components illustrated in FIG. 1 is provided for explanatory purposes only. In practice, network 100 may include additional components, fewer components, different components, and/or differently arranged components than those depicted in FIG. 1. Additionally, or alternatively, one or more components of network 100 may perform the tasks described as being performed by one or more other components of network 100.

Figure 2:
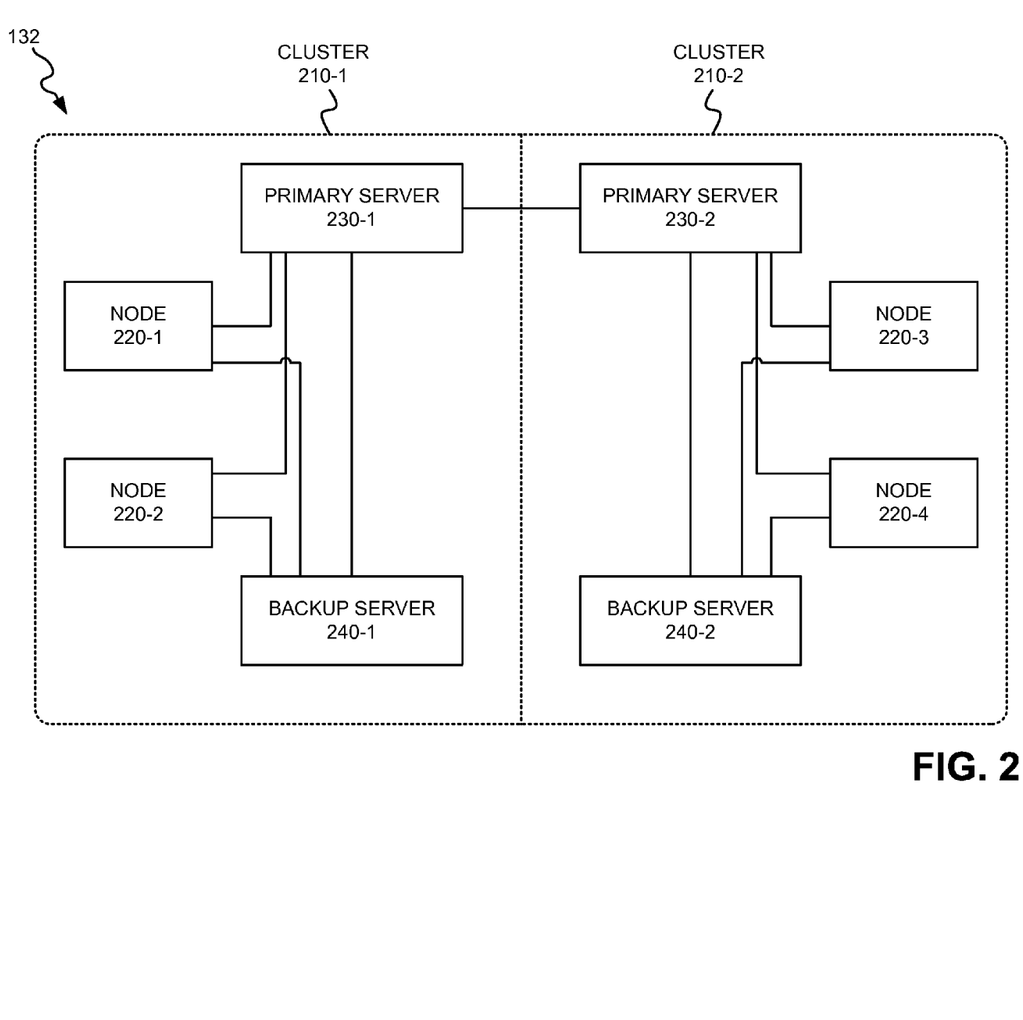
FIG. 2 is a diagram of example components that may be included in a video conferencing platform depicted in FIG. 1.

FIG. 2 is a diagram of example components that may be included in video conferencing platform 132. As illustrated, video conferencing platform 132 may include two video conferencing call processing clusters 210-1 and 210-2 (referred to collectively as "clusters 210" and, in some instances, individually as "cluster 210"). Each cluster 210 may process video conferencing calls (e.g., including, for example, configuring end points 110 for the calls, authenticating originating end points 110 and terminating end points 110, establishing the calls through IP network 130, and processing the on-going calls until the calls are terminated). In one embodiment, cluster 210-1 and cluster 210-2 may act as primary clusters for different types of video conferencing calls. For example, cluster 210-1 may act as a primary cluster for video conferencing calls that are established using a first type of call identifier and cluster 210-2 may act as a primary cluster for video conferencing calls that are established using a second, different type of call identifier. Additionally, or alternatively, cluster 210-1 may act as a backup to cluster 210-2 and cluster 210-2 may act as a backup to cluster 210-1, when a primary cluster is non-operational.

As illustrated, cluster 210-1 may include nodes 220-1 and 220-2, a primary server 230-1, and a backup server 240-1. Nodes 220-1 and 220-2 may include various network devices (described further with respect to FIG. 3 below) associated with enabling video conferencing between end points 110 via IP network 130. Such network devices may include, for example, edge routers, switches, and/or other devices that are involved with the establishment and on-going handling of a video conferencing call via IP network 130 between end points 110. In one embodiment, node 220-1 may act as a primary node and node 220-2 may act as a backup node, in the event that node 220-1 is non-operational. Thus, node 220-1 and node 220-2 may include the same information.

Primary server 230-1 may include one or more network devices that configure the appropriate end points 110 for a video conferencing call and control node 220-1 for the video conferencing call. For example, primary server 230-1 may receive information from a customer associated with end point 110-1 for a desired video conferencing call between the customer and customers at end points 110-2 and 110-3. Primary server 230-1 may configure end point 110-1 so that, for example, the video conferencing call can be established via a one button selection by the customer. Primary server 230-1 may also configure end points 110-2 and 110-3 to accept the video conferencing call.

Primary server 230-1 may perform call processing in connection with a video conferencing call. For example, primary server 230-1 may authorize end points 110 (or customers associated with those end points) that are part of the video conferencing call, determine whether the necessary resources are available for the video conferencing call, and/or assign resources for the video conferencing call.

Additionally, or alternatively, primary server 230-1 may monitor the health (also referred to as "availability") of components in cluster 210-1 and cluster 210-2. For example, primary server 230-1 may monitor the health of primary node 220-1, backup node 220-2, backup server 240-1, and primary server 230-2. If primary node 220-1 fails (or is otherwise non-operational), primary server 230-1 may fail over an on-going video conferencing call to node 220-2 or use node 220-2 for establishing a new video conferencing call. Additionally, or alternatively, primary server 230-1 may continually transfer information to backup server 240-1 to ensure that backup server 240-1 can take over for primary server 230-1 in the event of a failure of primary server 230-1 (or in the event that primary server 230-1 is otherwise non-operational). Additionally, or alternatively, primary server 230-1 may continually transfer information to primary server 230-2 to ensure that primary server 230-2 can take over for primary server 230-1 in the event of a failure of cluster 210-1 (e.g., indicating that primary server 230-1 and backup server 240-1 have failed or are otherwise non-operational). Thus, redundancy is provided in the event of a node 220, a primary server 230, and/or a cluster 210 are non-operational.

Backup server 240-1 may include one or more network devices that act as a backup for primary server 230-1. In one embodiment, backup server 240-1 may receive information from primary server 230-1 on a periodic basis and may store the information to allow backup server 240-1 to immediately take over for primary server 230-1 in the event of a failure of primary server 230-1 (or primary server 230-1 otherwise being non-operational). Backup server 240-1 may continually monitor the health of primary server 230-1.

Cluster 210-2 may be configured in a similar manner to cluster 210-1. For example, nodes 220-3 and 220-4 may be configured in a similar manner to nodes 220-1 and 220-2, respectively. In addition, primary server 230-2 may be configured in a similar manner to primary server 230-1 and backup server 240-2 may be configured in a similar manner to backup server 240-1.

The number of components illustrated in FIG. 2 is provided for explanatory purposes only. In practice, video conferencing platform 132 may include additional components, fewer components, different components, and/or differently arranged components than those depicted in FIG. 2. Additionally, or alternatively, one or more components of video conferencing platform 132 may perform the tasks described as being performed by one or more other components of video conferencing platform 132.

Figure 3:
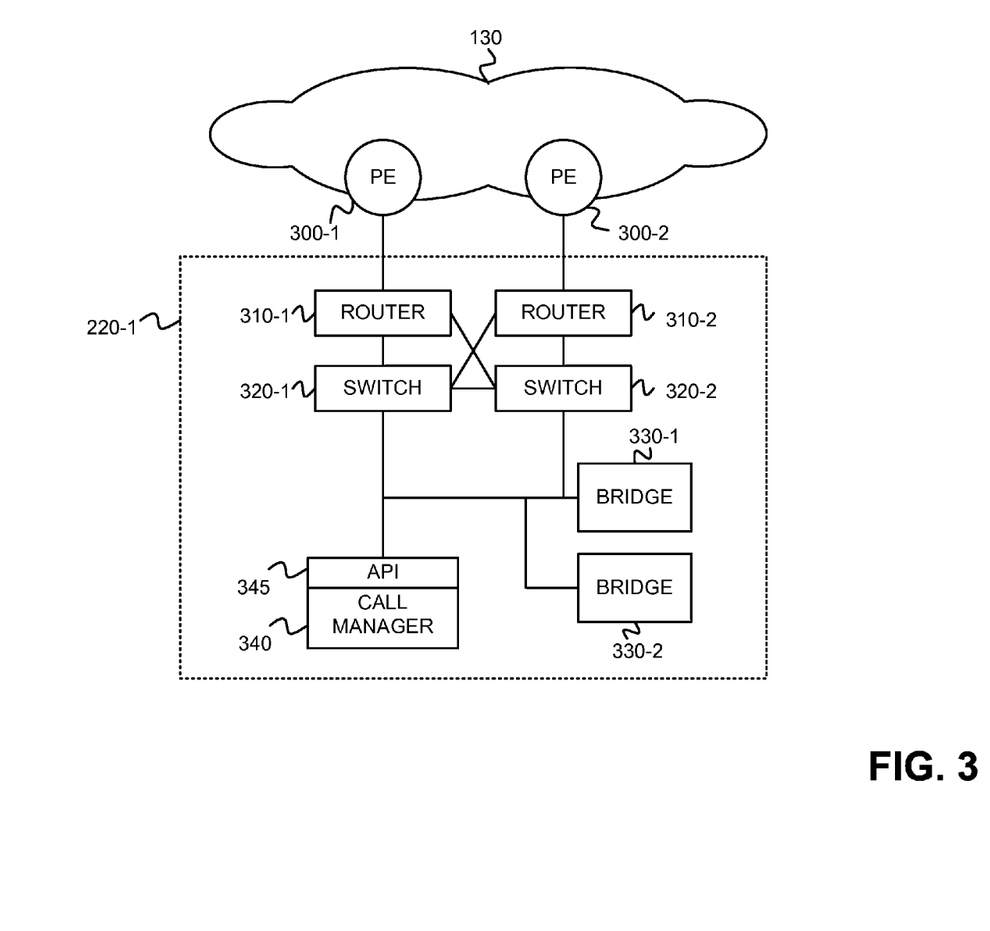
FIG. 3 is a diagram of example components that may be included in a node depicted in FIG. 2.

FIG. 3 is a diagram of example components that may be included in node 220-1, according to an example embodiment. It will be appreciated that node 220-2, node 220-3, and node 220-4 may be similarly configured. As illustrated, node 220-1 may include routers 310-1 and 310-2 (referred to collectively as "routers 310" and, in some instances, individually as "router 310", switches 320-1 and 320-2 (referred to collectively as "switches 320" and, in some instances, individually as "switch 320"), bridges 330-1 and 330-2 (referred to collectively as "bridges 330" and, in some instances, individually as "bridge 330"), a call manager 340, and an application programming interface (API) 345.

Routers 310 may include one or more devices that connect to a respective one of provider edge (PE) devices 300-1 and 300-2. Each of PE devices 300-1 and 300-2 may include a network device that provides connections to IP network 130. In one embodiment, PE devices 300-1 and 300-2 may provide connections to the MPLS VPN domain for node 220-1. In one embodiment, routers 310 may include, for example, ASR 1006 Aggregation Services Routers from Cisco Systems, Inc.

Switches 320 may include one or more devices that switch packets to/from IP network 130. Switches 320 may provide Layer 2 connectivity to customer video conferencing equipment. In one embodiment, switches 320 may each include, for example, a Catalyst 6513 Switch chassis, from Cisco Systems, Inc., having a high port density Fast Ethernet and Gigabit Ethernet aggregation. Video conferencing calls may be protected by the meshing of routers 310 with respective switches 320. In one embodiment, router 310-2 and switch 320-2 may serve as backups for router 310-1 and switch 310-1 (and vice versa).

Bridges 330 may include one or more devices that allow multiple end points 110 to be connected in a point-to-multipoint video conferencing call. In one embodiment, bridges 330 may include, for example, TelePresence Multipoint Switches (CTMSs) from Cisco Systems, Inc. Bridge 330-2 may, for example, act as a backup for bridge 330-1 (and vice versa). Thus, if bridge 330-1 fails, node 220-1 may use bridge 330-2 to establish a point-to-multipoint video conferencing call.

Call manager 340 may include one or more devices that provide video conferencing call processing. Call manager 340 may receive a video conferencing call request from an end point 110 and send, in response to receiving the request and using API 345, information relating to the video conferencing call to primary server 230-1 (or backup server 240-1 when primary server 230-1 is non-operational). Call manager 340 may also receive information from primary server 230-1 indicating whether the video conferencing call is permitted. In those situations where the video conferencing call is permitted, call manager 340 may establish the video conferencing call between the appropriate end points 110. In one embodiment, call manager 340 may include a Cisco Unified Communications Manager (CUCM), from Cisco Systems, Inc.

API 345 may include one or more components that validate requests for video conferencing calls. For example, API 345 may verify that a called number, as part of a request for a video conference, is valid for node 220-1. To this end, API 345 may include a table that contains valid prefixes for node 220-1. API 345 may receive a request for a video conferencing call, extract the called number from the request, and determine whether the prefix of the called number matches an entry in the valid prefixes table. If a match exists, API 345 may determine that the called number is valid for node 220-1. If a match does not exist, API 345 may determine that the called number is invalid for node 220-1 and may cause the request to be rejected.

API 345 may also verify that an originating number is valid for node 220-1. To this end, API 345 may include a mapping table that maps, for example, a combination of the called number, a passcode, and the originating number to processing information for a video conferencing call. API 345 may receive a request for a video conferencing call, extract the called number, the passcode, and the originating number from the request, and use this combination of information as a lookup key into the mapping table. If the lookup is successful, API 345 may cause the video conferencing call to be redirected to the appropriate component (e.g., bridge 330-1) for processing. If the lookup is unsuccessful, API 345 may determine that the originating number is invalid for node 220-1 and may cause the request to be rejected.

Additionally, or alternatively, API 345 may allow call manager 340 to communicate with primary server 230-1 (and/or backup server 240-1). For example, in response to receiving a request for a video conferencing call from an end point 110, API 345 may transfer the request for the video conferencing call (or information relating to the request) to primary server 230-1 (or backup server 240-1 when primary server 240-1 is non-operational). In one embodiment, API 345 may include, for example, a Java Telephony Application Programming Interface (JTAPI).

The number of components illustrated in FIG. 3 is provided for explanatory purposes only. In practice, node 220-1 may include additional components, fewer components, different components, and/or differently arranged components than those depicted in FIG. 3. Additionally, or alternatively, one or more components of node 220-1 may perform the tasks described as being performed by one or more other components of node 220-1.

Figure 4:
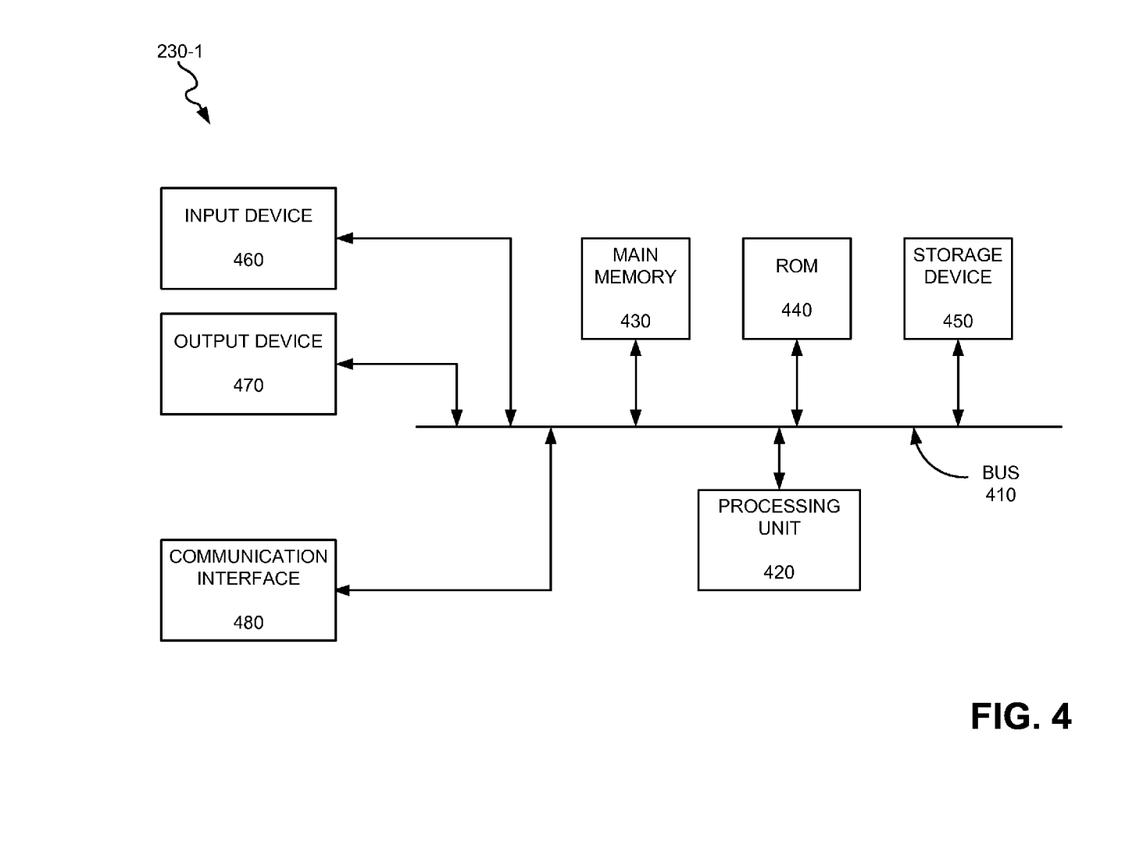
FIG. 4 is a diagram of example components that may be included in a server depicted in FIG. 2.

FIG. 4 is a diagram of example components that may be included in primary server 230-1. Servers 230-2, 240-1, and 240-2 may be similarly configured. In addition, call manager 340 may be similarly configured. As illustrated, primary server 230-1 may include a bus 410, a processing unit 420, a main memory 430, a read only memory (ROM) 440, a storage device 450, an input device 460, an output device 470, and a communication interface 480. Bus 410 may include a path that permits communication among the components of primary server 230-1.

Processing unit 420 may include a processor, microprocessor, and/or processing logic (e.g., an application specific integrated circuit (ASIC), a field programmable gate array (FPGA), or the like) that may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium and its corresponding drive.

Input device 460 may include one or more mechanisms that permit an operator to input information to primary server 230-1, such as, for example, a keypad or a keyboard, a voice recognition mechanism, a biometric mechanism, etc. Output device 470 may include one or more mechanisms that output information to the operator, including a display, a speaker, etc. Communication interface 480 may include any transceiver-like mechanism that enables primary server 230-1 to communicate with other devices and/or systems (e.g., call manager 340). For example, communication interface 480 may include mechanisms for communicating with another device or system via a network, such as IP network 130.

Primary server 230-1 may perform certain operations or processes, as will be described in detail below. Primary server 230-1 may perform these operations in response to processing unit 420 executing software instructions contained in a computer-readable medium, such as memory 430. A computer-readable medium may be defined as a physical or logical memory device. A logical memory device may include memory space within a single physical memory device or spread across multiple physical memory devices. Alternatively, hardwired circuitry may be used in place of or in combination with software instructions to perform operations described herein. Thus, embodiments described herein are not limited to any specific combination of hardware circuitry and software.

The number of components illustrated in FIG. 4 is provided for explanatory purposes only. In practice, primary server 230-1 may include additional components, fewer components, different components, and/or differently arranged components than those depicted in FIG. 4. Additionally, or alternatively, one or more components of primary server 230-1 may perform the tasks described as being performed by one or more other components of primary server 230-1.

Figure 5:
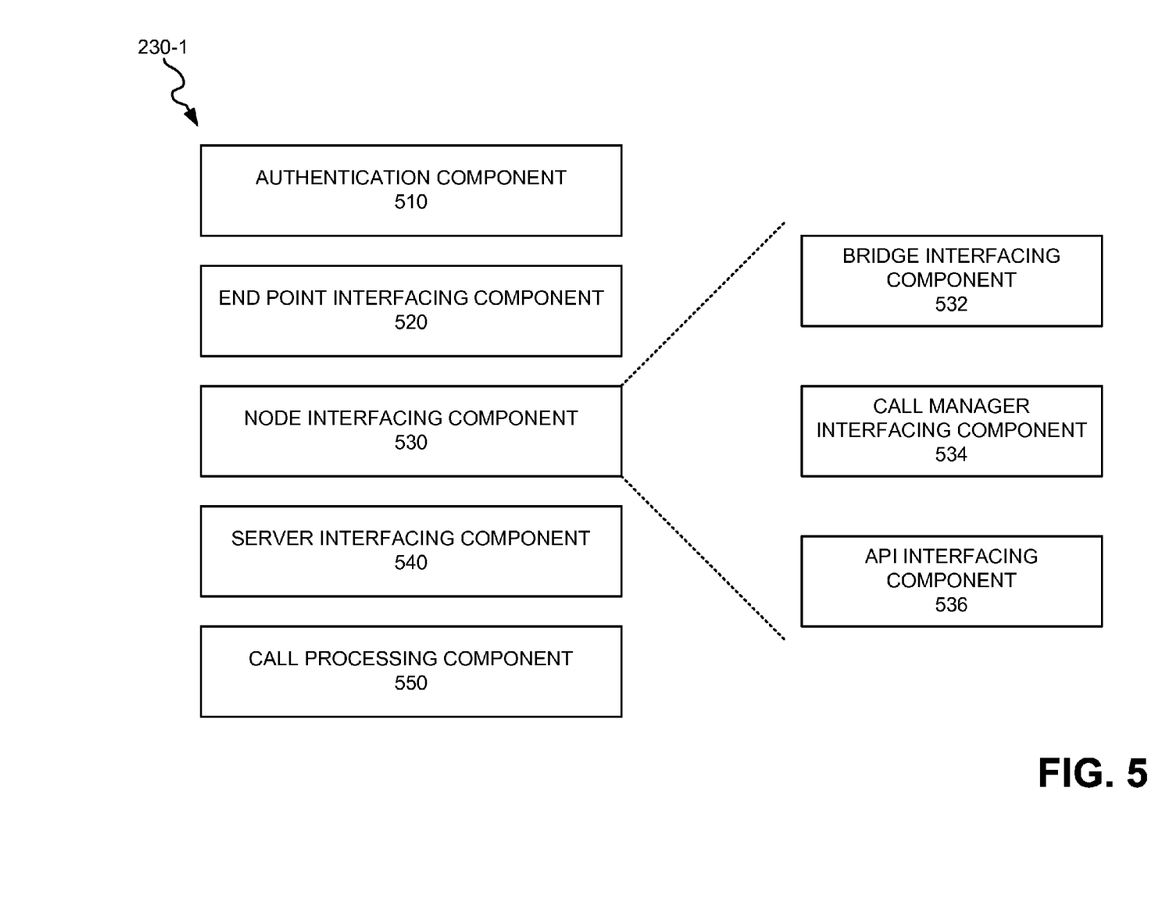
FIG. 5 is a diagram of example functional components that may be included in a server depicted in FIG. 2.

FIG. 5 is a diagram of example functional components that may be included in primary server 230-1. Servers 230-2, 240-1, and 240-2 may be similarly configured. As illustrated, primary server 230-1 may include an authentication component 510, an end point interfacing component 520, a node interfacing component 530, a server interfacing component 540, and a call processing component 550. The functional components described in FIG. 5 may be implemented in hardware or a combination of hardware and software. In one embodiment, the functional components described in FIG. 5 may, for example, be implemented by one or more of the components of primary server 230-1 depicted in FIG. 4.

Authentication component 510 may authenticate the originator (i.e., the customer or device that originates a video conferencing call) and the terminator(s) (i.e., the customer(s) or device(s) that will be participating in the video conferencing call with the originator) of a video conferencing call request. For example, authentication component 510 may receive information regarding a video conferencing call request from node 220-1 and parse the request to extract information relating to the originator, the terminator(s), and/or the video conferencing call. The information may include, for example, identification information regarding the originating end point (e.g., an address of the originating end point); identification information regarding the terminating end point(s) (e.g., an address of each terminating end point); identification information of the originating customer (e.g., a user name and/or password, a passcode, etc.); identification information of the terminating customer(s) (e.g., user name(s)); information relating to the video conferencing call (e.g., a video conferencing call identifier); and/or other types of information that may allow a video conferencing call to be authenticated.

Authentication component 510 may use the extracted information to authenticate the originator and the terminator(s) of the video conferencing call. For example, authentication component 510 may compare information relating to the originating end point and/or the originating customer to valid originator information. If the information relating to the originating end point and/or the originating customer matches valid originator information, authentication component 510 may determine that the originator has been properly authenticated. Similarly, authentication component 510 may compare information relating to the terminating end point and/or the terminating customer to valid terminator information. If the information relating to the terminating end point and/or the terminating customer matches valid terminator information, authentication component 510 may determine that the terminator has been properly authenticated. If the originator or terminator has not been properly authenticated, authentication component 510 may notify the originating customer and/or terminating customer(s) that the request for the video conferencing call has been rejected. In addition, authentication component 510 may provide information as to why the video conferencing call has been rejected.

End point interfacing component 520 may allow primary server 230-1 to communicate with end points 110. For example, primary server 230-1 may, via end point interfacing component 520, receive information from an originating customer associated with end point 110-1 for a desired video conferencing call between the originating customer and terminating customers at end points 110-2 and 110-3. Primary server 230-1 may, via end point interfacing component 520, configure end point 110-1 so that, for example, the video conferencing call can be established via a one button selection by the originating customer. Primary server 230-1 may also configure endpoints 110-2 and 110-3 to accept the video conferencing call.

Node interfacing component 530 may allow primary server 230-1 to communicate with nodes 220. For example, primary server 230-1 may, via node interfacing component 530, provide an indication to node 220-1 that a video conferencing call is permitted. Primary server 230-1 may also, via node interfacing component 530, determine the availability of nodes 220-1 and 220-2. For example, primary server 230-1 may, via node interfacing component 530, send, at periodic intervals, queries to nodes 220-1 and 220-2 to determine the status of nodes 220-1 and 220-2. If primary server 230-1 does not receive a response from a node (such as node 220-1) in the periodic interval, primary server 230-1 may determine that node 220-1 is non-operational. In this event, primary server 230-1 may, via node interfacing component 530, fail over node 220-1 to backup node 220-2.

In one embodiment, node interfacing component 530 may include a bridge interfacing component 532, a call manager interfacing component 534, and/or an API interfacing component 536. Bridge interfacing component 532 may allow primary server 230-1 to communicate with bridges 330. In one embodiment, primary server 230-1 may communicate with bridges 330, via bridge interfacing component 532, using Hypertext Transfer Protocol Secure (HTTPS). Via bridge interfacing component 532, primary server 230-1 may, for example, obtain, from a bridge 330, a list of static video conferencing meetings for which bridge 330 is configured, delete a static meeting that is configured on bridge 330, create a static meeting on bridge 330, obtain a list of video conferencing calls that are currently using bridge 330, and/or perform other actions.

In addition, primary server 230-1 may monitor, using bridge interfacing component 532, the availability of bridges 330-1 and 330-2. For example, bridge interfacing component 532 may include a heartbeat detection mechanism to periodically query each bridge 330 to determine the status of bridge 330. In one embodiment, the status of a bridge 330 may be determined based on the login and/or execution of the status query by bridge 330 and/or based on data from the status response by bridge 330 (e.g., by validating that all services that are identified by bridge 330 are listed as "running"). Primary server 230-1 may tag a bridge 330 as being in a failed state based on the determined status.

Call manager interfacing component 534 may allow primary server 230-1 to communicate with call manager 340. In one embodiment, call manager interfacing component 534 may be implemented as an Administrative eXtensible Markup Language Layer (AXL) application programming interface and may communicate with call manager 340 using HTTPS. Via call manager interfacing component 534, primary server 230-1 may, for example, add a route point to call manager 340, remove a route point from call manager 340, obtain, from call manager 340, a list of known route points, add a directory number to call manager 340 for a route point, remove a directory number from call manager 340, and/or perform other actions. A route point may be broadly defined as a virtual device that can receive multiple, simultaneous calls for application-controlled redirection.

In addition, primary server 230-1 may monitor, using call manager interfacing component 534, the availability of call manager 340. For example, call manager interfacing component 534 may include a heartbeat detection mechanism to periodically query call manager 340 to determine the status of call manager 340. In one embodiment, the status of call manager 340 may be determined based on the login and/or execution of the status query by call manager 340. Primary server 230-1 may tag call manager 340 as being in a failed state based on the determined status.

API interfacing component 536 may allow primary server 230-1 to communicate with API 345. In one embodiment, API interfacing component 536 may be implemented as a JTAPI interface. Via API interfacing component 536, primary server 230-1 may, for example, receive video conferencing call requests from API interface 345, send commands to call manager 340 regarding whether or not to permit a video conferencing call request, and/or perform other actions.

In addition, primary server 230-1 may update, using API interfacing component 536, API 345 based on the determined availability of node 220-1 and/or components of node 220-1. For example, primary server 230-1 may, if node 220-1 has been determined to have failed and using API interfacing component 536, update the valid prefixes table of API 345 in backup node 220-2 so that backup node 220-2 can accept video conferencing call re-connect attempts for node 220-1. In addition, primary server 230-1 may, if bridge 330-1 has been determined to have failed and using API interfacing component 536, update the mapping table of API 345 in node 220-1 so that video conferencing call requests are directed to backup bridge 330-2.

Server interfacing component 540 may allow primary server 230-1 to communicate with other servers, such as backup server 240-1 and primary server 230-2. In one embodiment, primary server 230-1 may send, via server interfacing component 540, a replica of the data stored on primary server 230-1 to backup server 240-1. In this way, backup server 240-1 may immediately take over the duties of primary server 230-1 in the event that primary server 230-1 is non-operational. Similarly, primary server 230-1 may send, via server interfacing component 540, a replica of the data stored on primary server 230-1 to primary server 230-2. In this way, primary server 230-2 may immediately take over the duties of primary server 230-1 in the event that cluster 210-1 is non-operational. Primary server 230-1 may also receive, via server interfacing component 540, a replica of the data stored on primary server 230-2. In this way, primary server 230-1 may immediately take over the duties of primary server 230-2 in the event that cluster 210-2 is non-operational.

Additionally, or alternatively, primary server 230-1 may, via server interfacing component 540, monitor the health of backup server 240-1 and primary server 230-2. For example, server interfacing component 540 may include a heartbeat detection mechanism that periodically sends queries to backup server 240-1 and primary server 230-2 to determine the status of backup server 240-1 and primary server 230-2. Primary server 230-1 may, based on responses to the queries, determine the availability of backup server 240-1 and primary server 230-2. In addition, primary server 230-1 may, using server interfacing component 540, receive heartbeat queries from backup server 240-1 and primary server 230-2 and send, in response to receiving the queries, information to backup server 240-1 and primary server 230-2 to inform backup server 240-1 and primary server 230-2 as to the availability of primary server 230-1.

Call processing component 550 may perform processing in relation to establishing a video conferencing call between appropriate end points 110 and processing for an on-going video conferencing call. For example, call processing component 550 may receive a result of the authentication performed by authentication component 510. If the originator and the terminator(s) have been properly authenticated, call processing component 550 may determine whether resources are available for establishing the requested video conferencing call and, if the necessary resources are available, assign resources for the video conferencing call. In response to the originator and terminator(s) being properly authenticated and/or in response to resources being assigned to the video conferencing call, call processing component 550 may send instructions to call manager 340 to allow the requested video conferencing call.

Call processing component 550 may also receive health information from node interfacing component 530 and server interfacing component 540 and fail over a node 220 and/or server 230, if the health information indicates that node 220 and/or server 230 are non-operational.

The number of functional components illustrated in FIG. 5 is provided for explanatory purposes only. In practice, primary server 230-1 may include additional functional components, fewer functional components, different functional components, and/or differently arranged functional components than those depicted in FIG. 5. Additionally, or alternatively, one or more functional components of primary server 230-1 may perform the tasks described as being performed by one or more other functional components of primary server 230-1.

Figure 6:
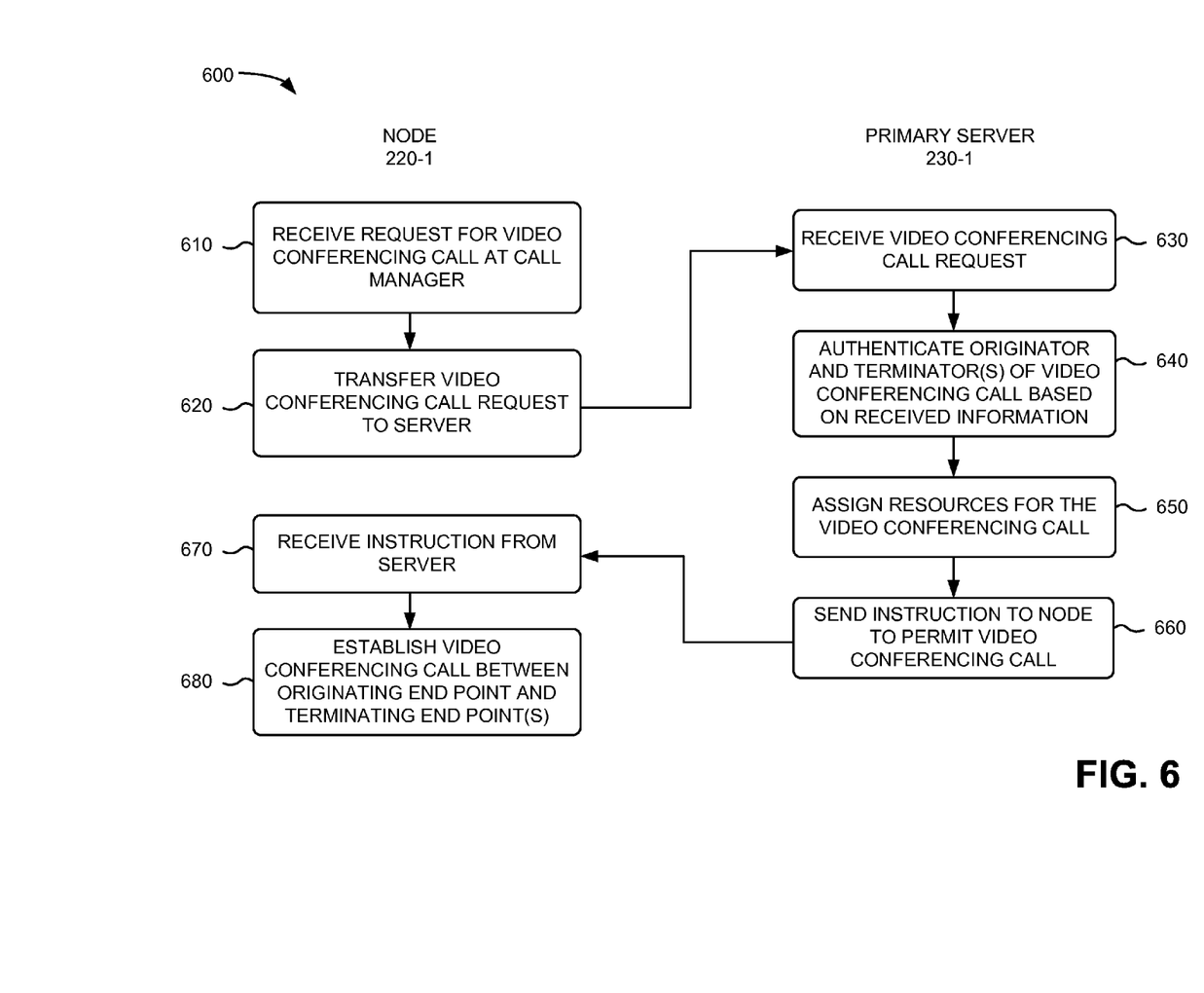
FIG. 6 is a flow chart illustrating an example process for processing a request for a video conferencing call according to an example embodiment.

FIG. 6 is a flow chart illustrating an example process 600 for processing a request for a video conferencing call according to an example embodiment. In one embodiment, process 600 may be performed by a node (e.g., node 220-1) and a server (e.g., primary server 230-1). In another embodiment, some or all of the processing described below may be performed by one or more devices, including or excluding node 220-1 and primary server 230-1.

Process 600 may include receiving a request for a video conferencing call (block 610). Assume, for explanatory purposes, that an end point (e.g., end point 110-1) initiates a point-to-multipoint video conferencing call with end point 110-2 and end point 110-3. In one embodiment, end point 110-1 may initiate the video conferencing call in response to an originating customer entering a particular network address (e.g., a particular IP address, a particular telephone number, etc.) into end point 110-1, selecting a particular button or menu item provided by end point 110-1, and/or performing other operations in connection with end point 110-1. Initiation of the video conferencing call may cause end point 110-1 to transmit a request for the video conferencing call. The request may include, for example, information associated with end point 110-1 (e.g., such as information identifying end point 110-1, information identifying the originating customer, and/or other types of information), information associated with end points 110-2 and 110-3 (e.g., such as information identifying end points 110-2 and 110-3, information identifying the terminating customers associated with end points 110-2 and 110-3, and/or other types of information), and/or other types of information. As a result, node 220-1 (e.g., call manager 340) may receive the request from end point 110-1 for the video conferencing call.

Process 600 may further include transferring the video conferencing call request to primary server 230-1 (block 620). For example, in response to receiving the video conferencing call request, node 220-1 (e.g., call manager 340) may transfer the video conferencing call request (or information relating to the video conferencing call request) to primary server 230-1. In one embodiment, node 220-1 may transfer the video conferencing call request to primary server 230-1 via API 345.

Process 600 may also include primary server 230-1 receiving the video conferencing call request from node 220-1 (block 630). For example, primary server 230-1 may receive the video conferencing call request via API interfacing component 536.

Process 600 may include authenticating the originator (e.g., end point 110-1 and/or the originating customer) and terminator(s) (e.g., end points 110-2 and 110-3 and/or the terminating customers) of the video conferencing call based on the received request (block 640). For example, primary server 230-1 (e.g., authentication component 510) may parse the received request to extract information relating to the originator and the terminator(s). The information may include, for example, identification information regarding end point 110-1 (e.g., an address of end point 110-1), identification information regarding end points 110-2 and 110-3 (e.g., an address of each terminating end point), identification information of the originating customer (e.g., a user name and/or password, passcode, etc.), identification information of the terminating customers (e.g., user name(s)), and/or other types of information that may allow the originator and terminators of the video conferencing call to be authenticated.

Authentication component 510 may use the extracted information to authenticate the originator and the terminators of the video conferencing call. For example, authentication component 510 may compare information relating to end point 110-1 and/or the originating customer to valid originator information. If the information relating to end point 110-1 and/or the originating customer matches valid originator information, authentication component 510 may determine that the originator has been properly authenticated. Similarly, authentication component 510 may compare information relating to end points 110-2 and 110-3 and/or the terminating customers to valid terminator information. If the information relating to end point 110-2 and 110-3 and/or the terminating customers matches valid terminator information, authentication component 510 may determine that the terminators have been properly authenticated. If the originator or terminators have not been properly authenticated, authentication component 510 may notify the originating customer and/or terminating customer(s) that the request for the video conferencing call has been rejected. In addition, authentication component 510 may provide information as to why the call request was rejected.

Process 600 may include assigning resources for the video conferencing call (block 650). Primary server 230-1 (e.g., call processing component 550) may determine whether resources are available for handling the video conferencing call. For example, call processing component 550 may determine whether sufficient bandwidth is available for the video conferencing call. If resources are unavailable for the video conferencing call, primary server 230-1 (e.g., call processing component 550) may notify the originating customer and/or the terminating customers that the request for the video conferencing call has been rejected. On the other hand, if resources are available for the video conferencing call, primary server 230-1 (e.g., call processing component 550) may assign resources for the video conferencing call. As part of assigning resources for the video conferencing call, primary server 230-1 may, using bridge interfacing component 532, configure bridge 330-1 (or bridge 330-2 if bridge 330-1 has been determined to be non-operational) for the video conferencing call.

Process 600 may further include sending an instruction to node 220-1 to permit the video conferencing call (block 660). Primary server 230-1 may send the instruction when the originator and terminators have been properly authenticated and when the resources have been assigned to the video conferencing call. Primary server 230-1 may, for example, send the instruction to node 220-1 via API interfacing component 536.

Process 600 may also include receiving the instruction from primary server 230-1 (block 670). For example, node 220-1 (e.g., call manager 340) may receive the instruction from primary server 230-1 via API 345.

Process 600 may include establishing, in response to receiving the instruction, the video conferencing call between an originating end point and terminating end points (block 680). For example, call manager 340 may communicate signaling messages through bridge 330-1 to end points 110-2 and 110-3 to establish the point-to-multipoint between end points 110-1, 110-2, and 110-3.

The number of blocks illustrated in FIG. 6 is provided for explanatory purposes only. In practice, process 600 may include additional blocks, fewer blocks, different blocks, and/or differently arranged blocks than those depicted in FIG. 6.

Figure 7:
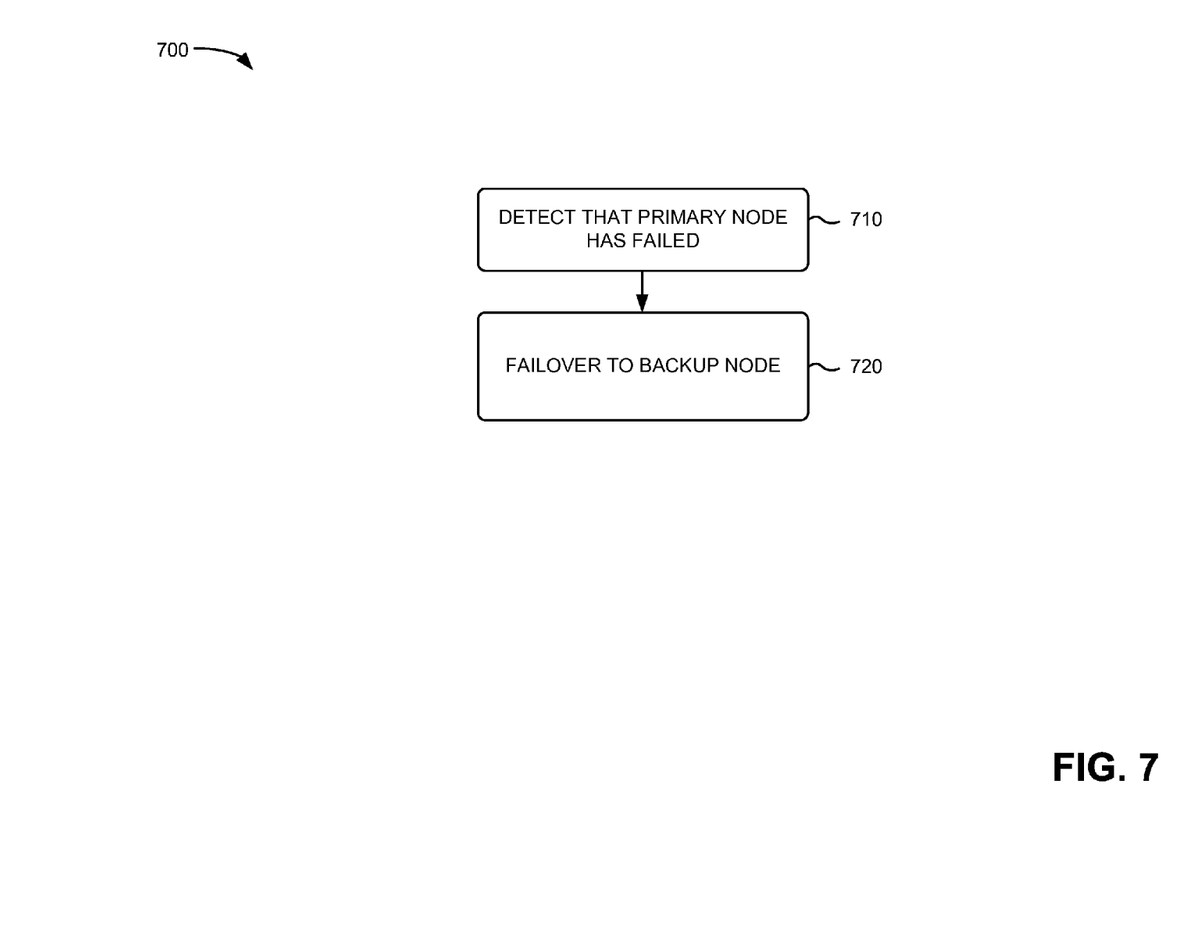
FIG. 7 is a flow chart illustrating an example process for failing over a node in connection with a video conferencing call.

FIG. 7 is a flow chart illustrating an example process 700 for failing over a node in connection with a video conferencing call. In one embodiment, process 700 may be performed by a server (e.g., primary server 230-1). In another embodiment, some or all of the processing described below may be performed by one or more devices, including or excluding primary server 230-1. Similar processing may be performed for failing over a primary server to a backup server or to another primary server.

Process 700 may include detecting that a primary node (e.g., node 220-1) has failed (block 710). As indicated above, primary server 230-1 may monitor, using call manager interfacing component 534, the availability of call manager 340 of primary node 220-1. For example, call manager interfacing component 534 may include a heartbeat detection mechanism to periodically query call manager 340 to determine the status of call manager 340. In one embodiment, the status of call manager 340 may be determined based on the login and/or execution of the status query by call manager 340. Primary server 230-1 may tag call manager 340 as being in a failed state based on the determined status.

Process 700 may further include failing over the primary node to the backup node (block 720). For example, in response to determining that primary node 220-1 has failed (or is otherwise non-operational), primary server 230-1 (e.g., call processing component 550) may cause a new video conferencing call request to be established using backup node 220-2 and/or transfer any on-going video conferencing calls, which were being handled by primary node 220-1, to be transferred to backup node 220-2.

In addition, primary server 230-1 (e.g., API interfacing component 536) may update API 345 based on the determined availability of node 220-1 and/or components of node 220-1. For example, primary server 230-1 may, if node 220-1 has been determined to have failed and using API interfacing component 536, update the valid prefixes table of API 345 in backup node 220-2 so that backup node 220-2 can accept video conferencing call re-connect attempts for node 220-1.

The number of blocks illustrated in FIG. 7 is provided for explanatory purposes only. In practice, process 700 may include additional blocks, fewer blocks, different blocks, and/or differently arranged blocks than those depicted in FIG. 7.

Figure 8:
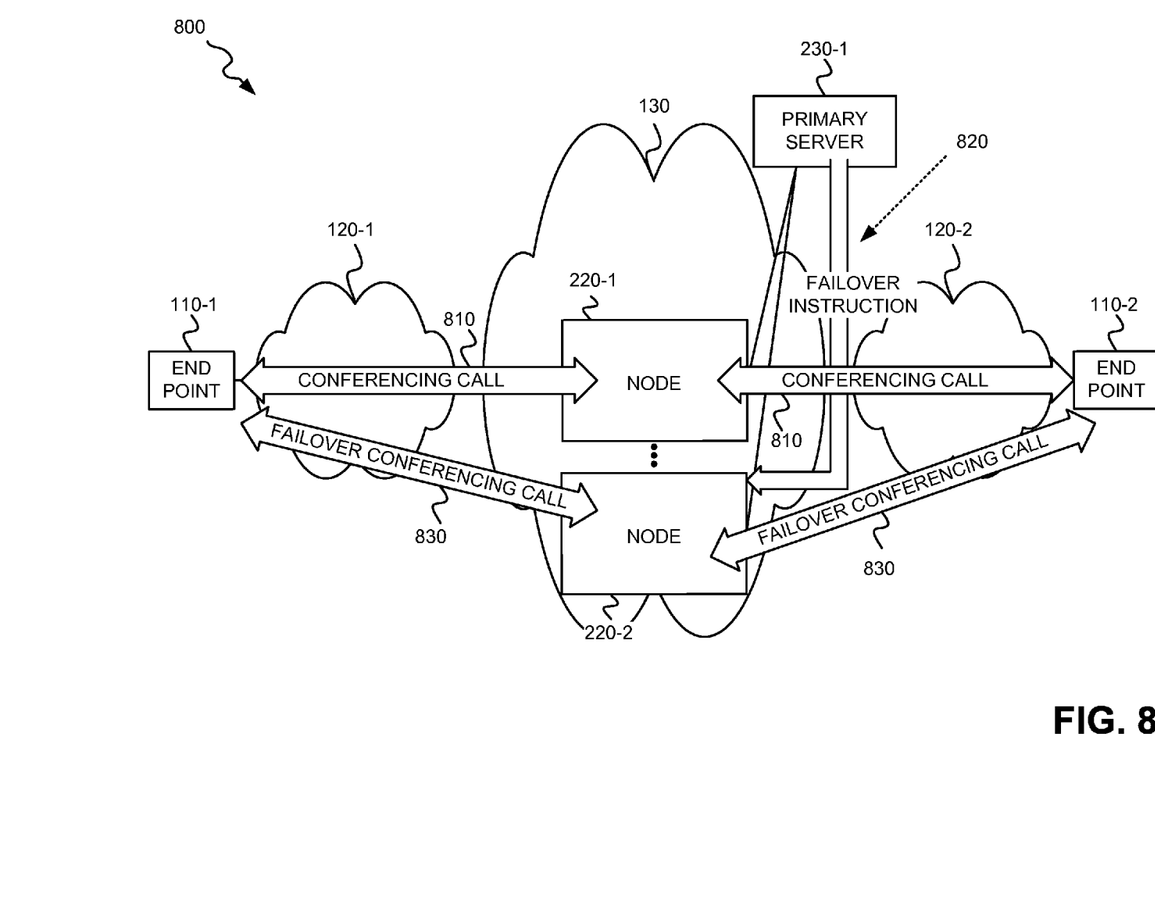
FIG. 8 depicts an example of a server failing over call control, when a failure is identified in a node, such that a video conferencing call is handled by another node.

FIG. 8 depicts an example 800 of a server failing over call control, when a failure is identified in a node, such that a conferencing call is handled by another node. In example 800, assume that node 220-1 is handling an on-going point-to-point conferencing call 810 between end point 110-1 and end point 110-2. Primary server 230-1 may monitor the health of nodes 220-1 and 220-2. Assume that primary server 230-1 detects that node 220-1 has failed. In response, primary server 230-1 may send a failover instruction 820 to node 220-2 to allow node 220-2 to take over control of conferencing call 810. Conferencing call 810 may then be handled by node 220-2, as shown by reference number 830.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6 and 7, the order of the blocks may be modified in other embodiments. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A server device comprising:
   a memory to store instructions; and
   a processor to execute the instructions to:
   receive, from a call manager, information associated with a request from an originating device to establish a conferencing call with one or more terminating devices,
   the information associated with the request including:
   first information identifying the originating device, and
   second information identifying the one or more terminating devices,
   the server device being different from a device that includes the call manager, and
   the call manager being responsible for establishing and handling conferencing calls in an Internet Protocol (IP) network,
   determine to permit establishing the conferencing call between the originating device and the one or more terminating devices based on the first information identifying the originating device and the second information identifying the one or more terminating devices with which the conferencing call is to be established, and
   provide an instruction to the call manager to permit establishing the conferencing call after determining to permit establishing the conferencing call.

2. The server device of claim 1, where the information associated with the request further includes one or more of:
   information identifying an originating customer associated with the originating device, or
   information identifying one or more terminating customers associated with the one or more terminating devices.

3. The server device of claim 1, where, when determining to permit the conferencing call, the processor is to:
   authenticate the one or more terminating devices with which the conferencing call is to be established.

4. The server device of claim 1, where, when determining to permit establishing the conferencing call, the processor is to:
   authenticate the originating device to obtain a first authentication result,
   authenticate the one or more terminating devices to obtain a second authentication result, and
   determine to permit establishing the conferencing call based on the first authentication result and the second authentication result.

5. The server device of claim 1, where, when determining to permit establishing the conferencing call, the processor is to:
   determine that resources are available for the conferencing call to be established between the originating device and the one or more terminating devices, and
   determine to permit establishing the conferencing call based on the resources being available for the conferencing call to be established.

6. The server device of claim 1,
   where the processor receives the information associated with the request via a Java Telephony Application Programming Interface (JTAPI), and
   where the processor provides the instruction via the JTAPI.

7. The server device of claim 1, where the processor is further to:
   monitor a health of the call manager,
   determine that the call manager has failed based on monitoring the health of the call manager, and
   fail over the conferencing call from the call manager to a backup call manager after determining that the call manager has failed.

8. The server device of claim 7, where, when failing over the conferencing call, the processor is to:
   modify a table in the backup call manager,
   the table storing valid prefixes for the call manager.

9. A method comprising:
   receiving, by a server device and from a call manager, information associated with a request from an originating device to establish a conferencing call with one or more terminating devices,
   the information associated with the request including:
   first information identifying the originating device, and
   second information identifying the one or more terminating devices,
   the server device being different from a device that includes the call manager, and
   the call manager being responsible for establishing and handling conferencing calls;
   determining, by the server device, to permit establishing the conferencing call between the originating device and the one or more terminating devices based on the first information identifying the originating device and the second information identifying the one or more terminating devices; and
   providing, by the server device, an instruction to the call manager to permit establishing the conferencing call after determining to permit establishing the conferencing call.

10. The method of claim 9, where the information associated with the request further includes one or more of:
    information identifying an originating customer associated with the originating device, or
    information identifying one or more terminating customers associated with the one or more terminating devices.

11. The method of claim 10, where determining to permit establishing the conferencing call includes:
    authenticating the one or more terminating devices with which the conferencing call is to be established.

12. The method of claim 10, where determining to permit establishing the conferencing call includes:
    authenticating an originating customer associated with the originating device to obtain a first authentication result,
    the first authentication result indicating whether the originating customer was properly authenticated,
    authenticating one or more terminating customers associated with the one or more terminating devices with which the conferencing call is to be established to obtain a second authentication result,
    the second authentication result indicating whether the one or more terminating customers were properly authenticated, and
    determining to permit establishing the conferencing call based on the first authentication result and the second authentication result.

13. The method of claim 9, where determining to permit establishing the conferencing call includes:
- determining that the one or more terminating devices have been properly authenticated based on the information identifying the one or more terminating devices,
- determining that resources are available for the conferencing call after determining that the one or more terminating devices have been properly authenticated, and
- determining to permit establishing the conferencing call based on the resources being available for the conferencing call.

14. The method of claim 9, further comprising:
monitoring a health of the call manager;
determining that the call manager has failed based on monitoring the health of the call manager; and
failing over the conferencing call from the call manager to a backup call manager after determining that the call manager has failed.

15. A non-transitory computer-readable medium storing instructions, the instructions comprising:
- one or more instructions that, when executed by at least one processor of a device, cause the at least one processor to:
  - receive information associated with a request from an originating end point to establish a video conferencing call with one or more terminating end points,
    - the information associated with the request including:
      - first information identifying the originating device, and
      - second information identifying the one or more terminating end points, and
    - the information associated with the request being received from a node responsible for establishing and handling the video conferencing call,
  - authenticate the one or more terminating end points based on the second information identifying the one or more terminating end points with which the video conferencing call is to be established, and
  - send, to the node, an instruction to permit establishing the video conferencing call between the originating device and the one or more terminating devices after authenticating the one or more terminating end points.

16. The non-transitory computer-readable medium of claim 15, where the node includes a plurality of bridges for establishing video conferencing calls with a plurality of terminating end points that include the one or more terminating end points.

17. The non-transitory computer-readable medium of claim 15, where the information associated with the request is received via a Java Telephony Application Programming Interface (JTAPI).

18. The non-transitory computer-readable medium of claim 15, where the instructions further comprise:
- one or more instructions that, when executed by the at least one processor, cause the at least one processor to:
  - monitor an availability of a backup device, and
  - transfer, based on the availability of the backup device, data to the backup device to allow the backup device to take over for the device.

19. The non-transitory computer-readable medium of claim 15, where the video conferencing call includes a high definition video conferencing call.

20. The non-transitory computer-readable medium of claim 15, where the instructions further comprise:
- one or more instructions that, when executed by the at least one processor, cause the at least one processor to:
  - monitor an availability of the node,
  - determine that the node is unavailable based on monitoring the availability of the node, and
  - fail over the video conferencing call from the node to a backup node based on determining that the node is unavailable.

* * * * *